(12) United States Patent
Charbon et al.

(10) Patent No.: US 10,138,529 B2
(45) Date of Patent: Nov. 27, 2018

(54) METHOD FOR FABRICATION OF A TIMEPIECE BALANCE SPRING

(71) Applicant: Nivarox-FAR S.A., Le Locle (CH)

(72) Inventors: Christian Charbon, Chezard-St-Martin (CH); Guido Plankert, Boppelsen (CH)

(73) Assignee: Nivarox-FAR S.A., Le Locle (CH)

( * ) Notice: Subject to any disclaimer, the term of this patent is extended or adjusted under 35 U.S.C. 154(b) by 169 days.

(21) Appl. No.: 15/292,403

(22) Filed: Oct. 13, 2016

(65) Prior Publication Data
US 2017/0159145 A1    Jun. 8, 2017

(30) Foreign Application Priority Data

Dec. 2, 2015 (EP) ..................... 15197406

(51) Int. Cl.
| | | |
|---|---|---|
| *C21D 9/02* | (2006.01) | |
| *C21D 6/00* | (2006.01) | |
| *C21D 8/06* | (2006.01) | |
| *C22C 38/00* | (2006.01) | |
| *C22C 38/58* | (2006.01) | |
| *C22C 38/04* | (2006.01) | |
| *C22C 38/08* | (2006.01) | |
| *C22C 38/38* | (2006.01) | |
| *G04B 17/06* | (2006.01) | |
| *G04B 17/22* | (2006.01) | |
| *G04B 43/00* | (2006.01) | |

(52) U.S. Cl.
CPC ............... *C21D 9/02* (2013.01); *C21D 6/004* (2013.01); *C21D 8/065* (2013.01); *C22C 38/002* (2013.01); *C22C 38/04* (2013.01); *C22C 38/08* (2013.01); *C22C 38/38* (2013.01); *C22C 38/58* (2013.01); *G04B 17/066* (2013.01); *G04B 17/227* (2013.01); *G04B 43/007* (2013.01)

(58) Field of Classification Search
CPC .......... C21D 9/02; C21D 8/065; C21D 6/004; C22C 38/58
See application file for complete search history.

(56) References Cited

U.S. PATENT DOCUMENTS 2,419,825 A    4/1947   Dinerstein

FOREIGN PATENT DOCUMENTS

| CH | 196408 | 3/1938 |
| CH | 286912 | 11/1952 |
| FR | 1 255 345 | 3/1961 |

OTHER PUBLICATIONS

European Search Report dated Apr. 15, 2016 in European Application 15197406.0 filed on Dec. 2, 2015 (with English Translation of Categories of Cited Documents).

*Primary Examiner* — Jessee R Roe
(74) *Attorney, Agent, or Firm* — Oblon, McClelland, Maier & Neustadt, L.L.P.

(57) ABSTRACT

Method for fabrication of an antiferromagnetic and temperature compensated timepiece balance spring, including the steps of:
    selecting an amagnetic iron-chromium-nickel-manganese-beryllium compensating alloy, comprising, by mass percent, between and including:
        from 21.0% to 25.0% of manganese,
        from 9.0% to 13.0% of nickel,
        from 6.0% to 15.0% of chromium,
        from 0.2% to 2.0% of beryllium,
        the remainder iron,
        the total of nickel and manganese being higher than or equal to 33.0%,
    working the alloy to obtain a blank,
    shaping the blank by casting and/or forging and/or wire drawing and/or rolling and/or drawing, to obtain a blank of spring wire;
    winding the wire on a winder to obtain a balance spring,
    subjecting the spiral spring to at least a heat setting treatment, by annealing at a temperature comprised between 540° C. and 650° C., for a duration of 30 to 200 minutes, to obtain a balance spring.

9 Claims, 1 Drawing Sheet

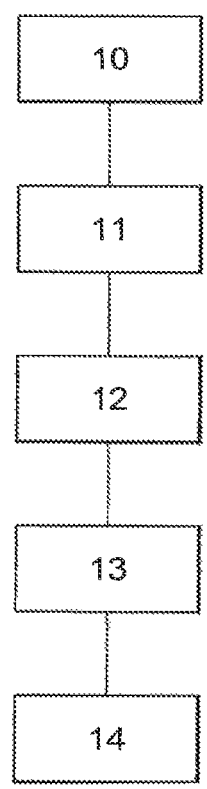

METHOD FOR FABRICATION OF A TIMEPIECE BALANCE SPRING

This application claims priority from European Patent application 15197406.0 of Dec. 2, 2015, the entire disclosure of which is hereby incorporated herein by reference.

FIELD OF THE INVENTION

The invention concerns a method for fabrication of an antiferromagnetic and temperature compensated timepiece balance spring.

The invention concerns the field of timepiece components affecting the rate of movements, in particular the components of escapement mechanisms.

BACKGROUND OF THE INVENTION

Temperature compensation of the sprung balance oscillator has traditionally been obtained through the use of a bimetallic balance wheel and a steel balance spring. The discovery of Elinvar by Ch. Ed Guillaume made it possible to simplify the oscillator by associating a monometallic balance with a compensated balance spring made of Elinvar. Different variants of the alloy then appeared under various different trade names such as "Nivarox", "Isoval", "Durinval", "Ni-span C", etc.

All these alloys have the drawback of reacting strongly to magnetic fields since they are ferromagnetic in nature.

It is an object of the present invention to propose a compensating alloy that is insensitive to magnetic fields.

Horological research has always sought to develop new alloys, having particular specifications, as regards temperature resistance, or the non-magnetic or antiferromagnetic nature of the alloys.

For example, CH Patent 286912 in the name of ELGIN discloses a spring made of a cobalt-chromium-nickel alloy with 20 to 60% cobalt, 15 to 30% chromium, less than 18% iron, from 0.01 to 0.09% beryllium, from 0.05 to 0.30% carbon, with a nickel-iron total comprised between 20 and 40%, and a nickel content greater than that of iron. U.S. Pat. No. 2,419,825 in the name of DINERSTEIN also discloses a spring alloy with a high elastic limit, with 30% nickel, 9% chromium, 1.5% manganese, 1% silicon, 0.3% tungsten, 0.06% carbon in the form of chromium carbide, 0.5% beryllium, traces of calcium, and the remainder iron, with a very particular production cycle. CH Patent 196408 in the name of INSTITUT STRAUMANN discloses a temperature compensating spring made of a heat-treatable alloy of nickel-iron-molybdenum-beryllium, in different compositions always having more than 35% nickel, more than 7% molybdenum, quite a variable percentage of beryllium within the range of 0.1% to 1%, and always less than 3% chromium.

Alloys of the iron-manganese-nickel-chromium type are acceptable for theoretically having good antiferromagnetic qualities, and, more specifically, iron-manganese-nickel-chromium-beryllium alloys. However, it is very difficult to determine compositions and methods of production that can ensure, in a reproducible manner, good temperature compensation characteristics, with as flat a range as possible, within the usual watchmaking temperatures, typically from 8° C. to 38° C., to avoid the use of the bimetallic materials normally used to compensate for thermal drifts.

Indeed, even if a particular composition should be capable of particular thermal properties, the production of such alloys proves extremely difficult, and very slight differences in certain parameters lead to a wide range of results. Routine testing cannot possibly lead a metallurgist to the desired performance.

Cold forming the components only adds to the complexity of the task, because of the large number of operating parameters relating, on the one hand, to the production of the alloy, and on the other hand, to the shaping thereof.

SUMMARY OF THE INVENTION

The invention therefore proposes to define a method for fabrication of an antiferromagnetic and temperature compensated timepiece balance spring, according to claim 1.

BRIEF DESCRIPTION OF THE DRAWINGS

Other features and advantages of the invention will appear upon reading the following detailed description, with reference to the annexed drawings, in which the only FIG. 1 is a block diagram illustrating the steps of the method according to the invention.

DETAILED DESCRIPTION OF PREFERRED EMBODIMENTS

The invention concerns a method for fabrication of an antiferromagnetic and temperature compensated timepiece balance spring.

According to the invention, the method includes the following steps:

(10) selecting an amagnetic compensating alloy, of the iron-chromium-nickel-manganese-beryllium type, comprising, by mass percent, between and including the range limit values:
from 21.0% to 25.0% of manganese,
from 9.0% to 13.0% of nickel,
from 6.0% to 15.0% of chromium,
from 0.2% to 2.0% of beryllium,
the remainder iron,
the total of nickel and manganese being higher than or equal to 33.0%,

(11) working said alloy to obtain a blank,

(12) shaping said blank by casting and/or forging and/or wire drawing and/or rolling and/or drawing, to obtain a blank of spring wire;

(13) winding said wire on a winder to obtain a spiral spring,

(14) subjecting said spiral spring to at least a heat setting treatment, by annealing at a temperature comprised between 540° C. and 650° C., for a duration of 30 to 200 minutes, to obtain a balance spring.

In a particular implementation of this method, the alloy contains, by mass percent, from 10.5% to 13.0% of nickel.

More particularly, this alloy contains, by mass percent, from 11.0% to 13.0% of nickel.

In a particular implementation of this method, the alloy contains, by mass percent, more than 7.5% of chromium.

More particularly, the alloy contains, by mass percent, more than 10.5% of chromium.

In a particular implementation of the method, the alloy contains, by mass percent, from 21.0% to 23.0% of manganese.

In a particular implementation of the method, the alloy contains, by mass percent, a total of nickel and manganese greater than or equal to 33.0%.

More particularly, the alloy contains, by mass percent, a total of nickel and manganese greater than or equal to 34.0%.

More particularly still, the alloy contains, by mass percent, a total of nickel and manganese less than or equal to 35.5%.

What is claimed is:

1. A method for fabricating an antiferromagnetic and temperature compensated timepiece balance spring, the method comprising:
   (10) selecting an amagnetic compensating alloy comprising, by mass percent, between and including the range limit values:
       from 21.0% to 25.0% of manganese,
       from 9.0% to 13.0% of nickel,
       from 6.0% to 15.0% of chromium,
       from 0.2% to 2.0% of beryllium,
       the remainder iron,
   the total of the nickel and the manganese being higher than or equal to 33.0%;
   (11) working said alloy to obtain a blank;
   (12) shaping said blank by casting, forging, wire drawing, rolling, drawing, or any combination thereof, to obtain a blank of spring wire;
   (13) winding said wire on a winder to obtain a spiral spring; and
   (14) subjecting said spiral spring to at least a heat setting treatment, by annealing at a temperature comprised between 540° C. and 650° C., for a duration of 30 to 200 minutes, to obtain a balance spring.

2. The method according to claim 1, wherein said alloy comprises, by mass percent, from 10.5% to 13.0% of the nickel.

3. The method according to claim 2, wherein said alloy comprises, by mass percent, from 11.0% to 13.0% of the nickel.

4. The method according to claim 1, wherein said alloy comprises, by mass percent, more than 7.5% to 15.0% of the chromium.

5. The method according to claim 4, wherein said alloy comprises, by mass percent, more than 10.5% to 15.0% of the chromium.

6. The method according to claim 1, wherein said alloy comprises, by mass percent, from 21.0% to 23.0% of the manganese.

7. The method according to claim 1, wherein said alloy comprises, by mass percent, a total of the nickel and the manganese of greater than or equal to 33.0%.

8. The method according to claim 7, wherein said alloy comprises, by mass percent, a total of the nickel and the manganese of greater than or equal to 34.0%.

9. The method according to claim 1, wherein said alloy comprises, by mass percent, a total of the nickel and the manganese of less than or equal to 35.5%.

* * * * *